Nov. 22, 1938.  E. G. CARROLL  2,137,525
BRAKE
Original Filed April 13, 1932    2 Sheets-Sheet 1

INVENTOR.
EUGENE G. CARROLL
BY Jerome R. Cox
ATTORNEY.

Nov. 22, 1938.　　　　E. G. CARROLL　　　　2,137,525
BRAKE
Original Filed April 13, 1932　　2 Sheets-Sheet 2

INVENTOR.
EUGENE G. CARROLL
BY Jerome R. Cox
ATTORNEY.

Patented Nov. 22, 1938

2,137,525

UNITED STATES PATENT OFFICE 2,137,525

BRAKE

Eugene G. Carroll, Los Angeles, Calif., assignor to Bendix Aviation Corporation, South Bend, Ind., a corporation of Delaware Original application April 13, 1932, Serial No. 605,083, now Patent No. 2,074,719. Divided and this application May 25, 1935, Serial No. 23,425

8 Claims. (Cl. 60—54.6)

This invention relates to brakes and more especially to hydraulic operating systems therefor.

One of the objects of my invention is to provide improved means for developing and maintaining a superatmospheric pressure acting upon the liquid in a hydraulic brake system so as to keep the operating part of the system full of liquid at all times and to eliminate the springy pedal accompanying the presence of air mixed with the liquid in said operating part of the system.

A further object of the invention is to provide improved means for preventing the ingress of air into the operating parts of the system and especially into the wheel cylinders thereof.

Further objects of the invention will be apparent after a reading of the subjoined specification and claims and after a consideration of the attached drawings in which:

Figure 1:
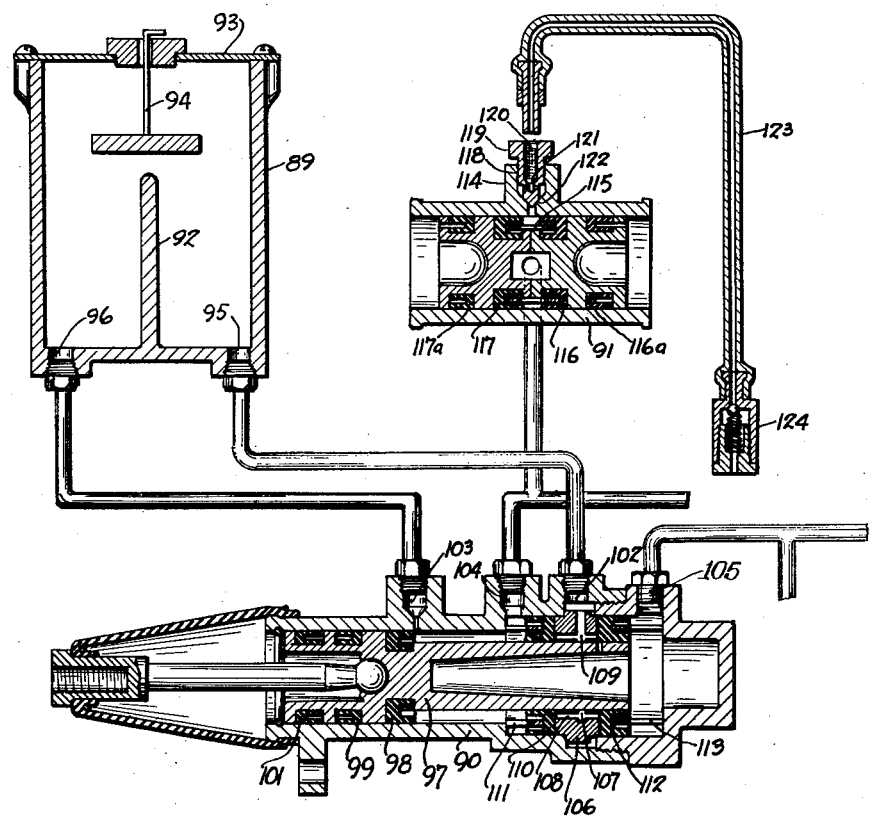
Figure 1 is a view showing, more or less diagrammatically, parts of a hydraulic braking system including a master cylinder, a wheel cylinder, and connections between the master cylinder and the wheel cylinder.

The brake system shown in Figure 1 comprises a reservoir 89, a master cylinder 90, and wheel cylinder 91. The reservoir 89 is provided with a partition 92, a cover 93, and a liquid level indicator 94. It has outlet openings 95 and 96 which are connected to the master cylinder 92.

The master cylinder 90 has a plunger 97 provided with a plurality of annular sealing cups such as 98, 99 and 101, the first named facing forward and the last two named being reversed relative to each other and positioned toward the rear. By reason of these cups, fluid is prevented from leaving or entering the cylinder except through openings 102 and 103 which are connected with the openings 95 and 96 respectively of reservoir 89 or through openings 104 and 105 connected with the front and rear brakes respectively.

The plunger 97 slides through a head 106 which is secured within the cylinder 90 so as to be allowed a limited longitudinal movement therein, the head being provided with ports such as 107, 108, and 109 communicating with the opening of 102. Rearwardly of the head 106, there is provided an annular packing cup 110 which faces rearwardly and is held in position by a tubular member 111 which may be formed if desired by a short section of pipe. Forward of the head 106 there is provided a similar packing cup 112 which faces forwardly and is held in position by a similar tubular member 113. It is to be noted that the length of members 111 and 113 as well as the groove in which the head 106 is seated allow a slight longitudinal movement of the head 106 and with it, the cups 109 and 112 so as to allow equalizing of pressure between the front and rear brakes.

The wheel cylinder 91 is provided with an annular boss or projection 114 corresponding to the projection 62. However, a tubular member 115 is provided for holding the cups 116 and 117 in position when the fluid in the cylinder is not under brake applying pressure. It is to be understood that when operating pressure is applied to the fluid, the fluid itself maintains the cups in their position. The plungers are also provided with additional packing cups 116$^a$ and 117$^a$ smaller in area and facing outward. The projection 114 is internally threaded as at 118 and has screwed therein a plug 119 formed with a conical end adapted to seat in a conical shaped valve seat concentric with the projection 114. The plug 119 is itself formed with a tapped opening 120 and with intersecting bores 121 and 122. A bleeding hose 123 provided with a check valve 124 is adapted to be threaded into the tapped opening 120 for the bleeding operation, the plug 118 being adapted to be loosened for the same operation.

In the operation of the braking system shown in Figure 1, pressure applied by the pedal is adapted to move the plunger 97 forward, thus immediately closing the port leading to the opening 103 and forcing fluid through the outlet opening 104 to the front brakes and through the outlet opening 105 to the rear brakes. The displaced fluid creates pressure in the wheel cylinders and forces the plungers in the wheel cylinders apart for applying the brakes. Slight movement of the head 106 is normally effective to equalize the pressure between the front system and the rear system. However, should a leak develop in either the connections leading to the front brakes, or in the connections leading to the rear brakes, the head 106 will move to its limit of travel and the other system of brakes (rear or front) will be unaffected by the leak.

In the bleeding operation the plug 118 is backed off slightly from its seat and the bleeding hose 123 is attached. Then liquid is forced to the wheel cylinders by movement of the piston and is thence forced out past the check valve 124 carrying with it any air which may be trapped in the system. On the return stroke, the check valve 124 prevents air from returning into the wheel cylinder and additional liquid is drawn into the master cylinder through the opening 102 and then through the bores 107, 108, and 109 and past the cups 110 and 112. Should an excess of pressure be developed in the system, the pressure may be relieved through openings 103 and 114 when the parts are in the brake-off position. It is to be understood that during the bleeding operation, the plug 118 is backed off slightly from its seat.

Figure 2:
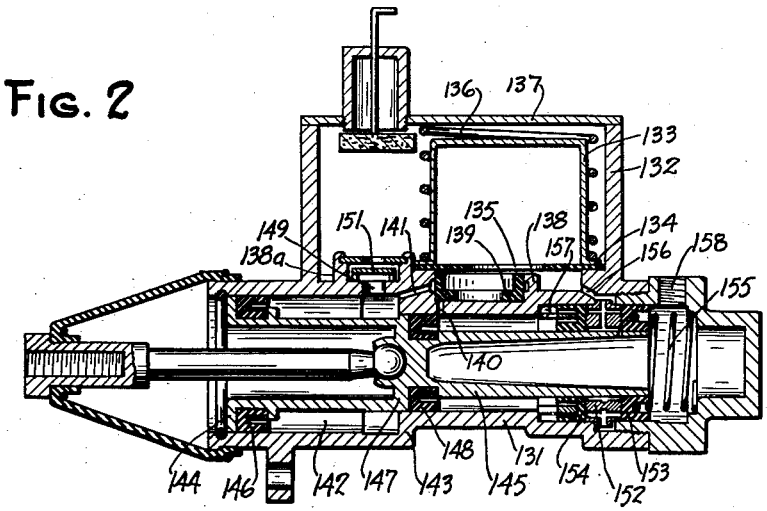
Figure 2 is a view showing a modified form of master cylinder adapted to be substituted for the master cylinder shown in Figure 1.

In Figure 2 I have shown a modified form of cylinder somewhat similar to that shown in Figure 1, but differing in certain details therefrom. The master cylinder 131 has formed integrally therewith a covered annular flange 132 which serves as a combined reservoir and pressure chamber for supercharging the system. Positioned in the flange 132 is an inverted container 133 formed with a flange 134. The container is normally urged downward into contact with an annular packing plate 135 by means of a compression spring 136 which at its lower end bears upon the flange 134 and at its upper end bears against the cover 137 for the flange 132. The cylinder 131 is also provided with two other smaller annular flanges 138 and 138ᵃ, neither concentric with the flange 132. In the well formed by the flanges 138 there is positioned an annular sealing cup 139 having an L-cross section. The cup 139 covers ports 140 and 141 which allows liquid to flow into the interior of the container 133 from the ports 140 and 141 but prevents liquid from passing out through the ports 140 and 141 from the interior of the container 133. The port 141 leads to a chamber 142 formed between a shoulder 143 provided in the cylinder 131 and a head or piston 144 formed at the rear of the plunger 145, the port 140 normally leading forward of that chamber. Coacting with the head 144 is an annular sealing cup 146 which prevents the passage of fluid rearward past the head. The plunger 145 is also formed with a forward head 147 provided with a sealing cup 148, the head and the cup forming a piston and being normally positioned just rearwardly of the port 140 and forwardly of the point at which the port 141 connects with the chamber 142. When the plunger is operated, however, the piston is moved forward past the port 140. The chamber 142 is also provided with an opening 149 connected through the well formed by the flange 138ᵃ with the reservoir 132 outside of a container 133, the reservoir outside of the container being vented to the atmosphere. Associated with the opening 149 is a check valve 151 seated in the flange 138ᵃ, the valve allowing liquid to flow in from the reservoir 132 to the chamber 142 but preventing liquid from passing from the chamber to the reservoir.

The cylinder 131 is provided with an equalizing head 152 corresponding substantially with the head 106 and with cups 153 and 154 corresponding substantially to the cups 112 and 110. The cup 153, however, is normally maintained upon its seat by means of a spring 155 which also normally urges the head 152 toward its rearward position. Liquid is supplied to the passageways formed in the head 152 through a diagonal port 156 which leads to the interior of the container 133.

Before operation of this form of master cylinder, liquid is poured into the reservoir 132. Operation of the plunger 145 forces air trapped in the cylinders through the openings 157 and 158 to the forward and rear brakes respectively and out of the wheel cylinder past a check valve such as one of the check valves 63 or 124. On the rearward stroke, liquid is drawn into the chamber 142 past the check valve 151. Subsequent forward strokes force the liquid drawn into chamber 142 through port 141 into the container 133 and thence through the port 156 past the cups 153 and 154 to the forward brake system and the rear brake system. After the system has been filled with liquid, slight losses of liquid from the forward brake system may be compensated for by passage of liquid forward past the cup 148 as well as by passage of liquid rearward past the cup 154. Losses of liquid in the rear brake system is compensated by passage of liquid past the cup 153. Repeated operations of the plunger serves to supercharge the pressure by drawing in liquid past the valve 151 and forcing it through the port 141 into the container 133 and to the top of said container until the pressure therein reaches the weight of the spring 136 whereupon the pressure in the container 133 may be relieved back to the main part of the reservoir 132 by lifting the container off of the packing 135.

Figure 3:
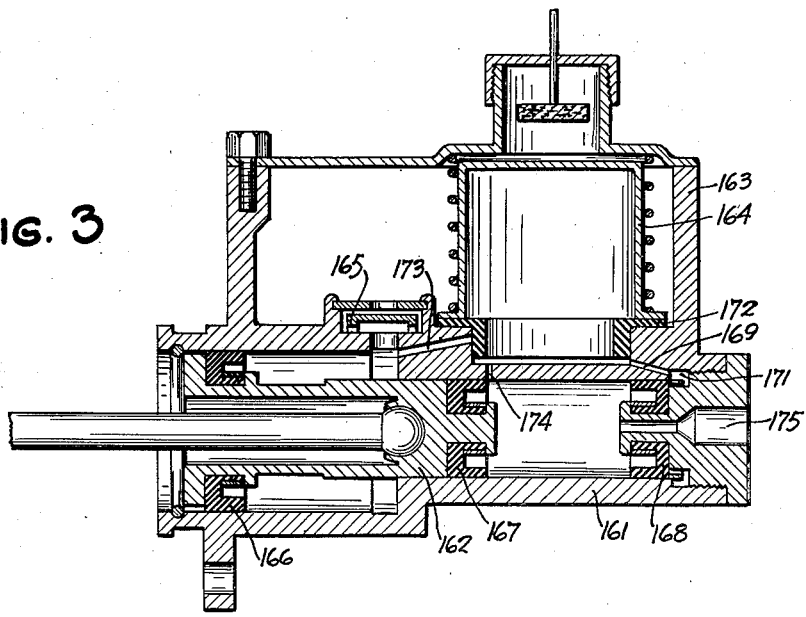
Figure 3 is a view showing another modified form of master cylinder also adapted to be substituted for the master cylinder shown in Figure 1.

The modified form of master cylinder shown in Figure 3 is very similar to that shown in Figure 2 but is considerably simpler and cheaper to construct inasmuch as no arrangements are provided for separate systems for the front and rear brakes. Therein the cylinder 161 has a plunger 162 which corresponds substantially to the plunger 145, a reservoir 163 which corresponds substantially to the reservoir 132, and a container 164 which corresponds substantially to the container 133. The check valve 165 corresponds substantially to the check valve 151, and the cups 166, 167, 168 correspond substantially to the cups 145, 148 and 154. A port 169 corresponding to the port 156 leads to an annular recess 171 which corresponds substantially to the recess for the equalizing head 152. However, an annular flanged packing 172 which has an L-shape in cross section fulfills the functions of the annular packing 134 and also fulfills part of the functions of the cup 139 in serving as a one-way check valve for the port 173. The port 174 is closed only when covered by the cup 167. An outlet port 175 at the forward end of the cylinder is located in the center of the cup 168 and leads to all of the wheel cylinders of the front and rear brakes.

The operation of this form of my device is substantially the same as that shown in Figure 2, with the exception that no provision is made for keeping the front brake system separate from the rear brake system.

This application is a division of my copending application Serial No. 605,083, filed April 13, 1932 upon which Patent Number 2,074,719 has been issued.

It is to be understood that the above described embodiments of my invention are for the purpose of illustration only and various changes may be made therein without departing from the spirit and scope of the invention.

I claim:
1. In a hydraulic brake system a master cylin- der, a reservoir associated with said master cylinder, an inverted container positioned in said reservoir, a spring bearing upon said inverted container, and means for forcing fluid into said container to supercharge the pressure in said system.

2. In a hydraulic brake system a master cylinder, a reservoir associated with said master cylinder, an inverted container positioned in said reservoir, a spring bearing upon said inverted container, means for forcing fluid into said container to supercharge the pressure in said system, a master piston in said cylinder, and a check valve interposed between said container and said master cylinder.

3. In a hydraulic brake system a master cylinder, a reservoir associated with said master cylinder, an inverted container positioned in said reservoir and dividing the reservoir into two portions, means for forcing fluid into said inverted container for supercharging the pressure of liquid therein, and means for venting the other portion of said reservoir for maintaining the liquid therein under atmospheric pressure.

4. In a hydraulic brake system a master cylinder formed with a pair of ports, a plunger positioned in said master cylinder and having a piston head normally maintained between said ports but moving in its operation to a position in advance of both ports, a reservoir associated with said cylinder, and an annular cup packing of L-shaped cross section positioned in said reservoir and covering both of said ports, whereby the packing serves as a one-way check valve for both of said passages.

5. In a hydraulic brake system a reservoir for hydraulic fluid, means for dividing the reservoir into two portions, one of which is maintained under atmospheric pressure and the other of which is maintained under supercharged pressure, resilient means in said other portion for maintaining said supercharged pressure, means for discharging fluid into said other portion upon operation of the braking system and means for discharging fluid from said other portion into said first portion when a certain pressure is exceeded.

6. In a hydraulic brake system a master cylinder, a reservoir associated with said master cylinder and having a well formed in the bottom thereof, an annular packing of L-shaped cross section positioned in said well, and a connection leading from said well to said master cylinder said packing covering the opening to said connection and acting as a check valve therefor.

7. In a hydraulic brake system, a reservoir for hydraulic fluid, means for dividing the reservoir into two portions, resilient means comprising trapped air for maintaining a supercharged pressure on the fluid in one of said portions, an atmospheric vent in the other portion, means for discharging fluid into said one portion upon operation of the braking system, and means for discharging fluid from said one portion into the other portion when a certain pressure is exceeded.

8. In a hydraulic brake system, a reservoir for hydraulic fluid, means for dividing the reservoir into two portions, resilient means comprising trapped air for maintaining a supercharged pressure on the fluid in one of said portions, an atmospheric vent in the other portion, means for discharging fluid into said one portion upon operation of the braking system, and means for discharging fluid from said one portion into the other portion when a certain pressure is exceeded, said last-named means being below the liquid level in said one portion.

EUGENE G. CARROLL.